United States Patent
Choi et al.

(10) Patent No.: US 12,371,533 B2
(45) Date of Patent: Jul. 29, 2025

(54) CURABLE COMPOSITION AND OPTICAL MATERIAL

(71) Applicant: LG CHEM, LTD., Seoul (KR)

(72) Inventors: Hee Jung Choi, Daejeon (KR); Jeewoo Lim, Daejeon (KR); Heon Kim, Daejeon (KR); Donghwa Seo, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 847 days.

(21) Appl. No.: 17/613,001

(22) PCT Filed: Oct. 26, 2020

(86) PCT No.: PCT/KR2020/014629
§ 371 (c)(1),
(2) Date: Nov. 19, 2021

(87) PCT Pub. No.: WO2021/085956
PCT Pub. Date: May 6, 2021

(65) Prior Publication Data
US 2022/0204702 A1    Jun. 30, 2022

(30) Foreign Application Priority Data
Oct. 31, 2019    (KR) .................. 10-2019-0137547

(51) Int. Cl.
*C08G 75/14*    (2006.01)
*G02B 1/04*    (2006.01)

(52) U.S. Cl.
CPC ............. *C08G 75/14* (2013.01); *G02B 1/041* (2013.01)

(58) Field of Classification Search
CPC ... C08L 81/02; C08L 2201/10; C07D 331/02; C08G 75/14; C08G 75/08; C08K 3/06; G02B 1/04; G02B 1/041
See application file for complete search history.

(56) References Cited

U.S. PATENT DOCUMENTS

| | | | |
|---|---|---|---|
| 6,995,276 B1 | 2/2006 | Okubo et al. | |
| 9,283,185 B2 | 3/2016 | Kurzrock et al. | |
| 11,370,887 B2 * | 6/2022 | Wagener | C08G 75/20 |

(Continued)

FOREIGN PATENT DOCUMENTS

| | | |
|---|---|---|
| CN | 1436779 A | 8/2003 |
| CN | 106164120 A | 11/2016 |

(Continued)

OTHER PUBLICATIONS

H. Shin, et al., "Aqueous "polysulfide-ene" polymerization for sulfur-rich nanoparticles and their use in heavy metal ion remediation", Journal of Materials Chemistry A, vol. 6, No. 46, pp. 23542-23549.

(Continued)

*Primary Examiner* — Shane Fang
(74) *Attorney, Agent, or Firm* — Bryan Cave Leighton Paisner LLP

(57) ABSTRACT

A curable composition for forming a high refractive index optical material, the curable composition comprising an episulfide compound; sulfur-containing organic particles comprising a specific content of sulfur atoms; and a reducing agent, and an optical material comprising the curable composition.

7 Claims, 1 Drawing Sheet

Scale bar = 1 μm

(56) References Cited

U.S. PATENT DOCUMENTS

| | | |
|---|---|---|
| 2001/0002413 A1 | 5/2001 | Morijiri et al. |
| 2001/0008278 A1 | 7/2001 | Yoshimura et al. |
| 2002/0019511 A1 | 2/2002 | Morijiri et al. |
| 2004/0024165 A1 | 2/2004 | Yoshimura et al. |
| 2010/0130661 A1 | 5/2010 | Takeuchi et al. |
| 2010/0137555 A1 | 6/2010 | Itoh et al. |
| 2012/0142889 A1 | 6/2012 | Aoki et al. |
| 2013/0231425 A1 | 9/2013 | Takemura et al. |
| 2014/0199592 A1* | 7/2014 | Pyun .............. H01M 4/0404 252/511 |
| 2015/0203633 A1 | 7/2015 | Takemura et al. |
| 2015/0247955 A1 | 9/2015 | Jang et al. |
| 2016/0259091 A1 | 9/2016 | Horita et al. |
| 2016/0264697 A1 | 9/2016 | Moravek et al. |
| 2017/0051095 A1 | 2/2017 | Takemura et al. |
| 2018/0127549 A1 | 5/2018 | Imagawa et al. |
| 2018/0259679 A1 | 9/2018 | Kariyazono et al. |

FOREIGN PATENT DOCUMENTS

| | | |
|---|---|---|
| CN | 107400237 A | 11/2017 |
| EP | 1 334 974 A1 | 8/2003 |
| EP | 2 128 178 A1 | 12/2009 |
| EP | 2 144 092 A1 | 1/2010 |
| EP | 2 431 401 A1 | 3/2012 |
| EP | 2 540 762 A1 | 1/2013 |
| EP | 2 641 928 A1 | 9/2013 |
| EP | 3 133 098 A1 | 2/2017 |
| EP | 3 312 216 A1 | 4/2018 |
| JP | 2001200058 A | 7/2001 |
| JP | 2002090502 A | 3/2002 |
| JP | 2002-194083 A | 7/2002 |
| JP | 2003238562 A | 8/2003 |
| JP | 2004-115816 A | 4/2004 |
| JP | 2006-199724 A | 8/2006 |
| JP | 2008-174757 A | 7/2008 |
| JP | WO2008-136401 A | 7/2010 |
| JP | 2012-233044 A | 11/2012 |
| JP | 2014-084440 A | 5/2014 |
| JP | 6098112 B2 | 3/2017 |
| JP | 6172414 B2 | 7/2017 |
| KR | 10-2014-0040056 A | 4/2014 |
| KR | 10-1608961 B1 | 4/2016 |
| KR | 10-2016-0102961 A | 8/2016 |
| KR | 10-2018-0018482 A | 2/2018 |
| KR | 10-1998638 B1 | 7/2019 |
| KR | 10-2020-0046829 A | 5/2020 |

OTHER PUBLICATIONS

Jee woo Lim et al., "High Sulfur Content Polymer Nanoparticles Obtained from Interfacial Polymerization of Sodium Polysulfide and 1,2,3-Trichloropropane in Water", Macromolecular Rapid Communications, vol. 36, No. 11, Jun. 1, 2015, pp. 1103-1107.

Hatice Mutlu et al., "Sulfur Chemistry in Polymer and Materials Science", Macromolecular Rapid Communications, WILEY-VCh, DE, vol. 40, No. 1, Jan. 1, 2019, pp. 1800650-1800701.

A. Rehor et al., "A New Living Emulsion Polymerization Mechanism: Episulfide Anionic Polymerization", Macromolecules, American Chemical Society, US, vol. 35, No. 23, Nov. 1, 2002, pp. 8688-8693.

Jared J. Griebel et al., "New Infrared Transmitting Material via Inverse Vulcanization of Elemental Sulfur to Prepare High Refractive Index Polymers", Advanced Materials, VCH Publishers, DE, vol. 26, No. 19, May 1, 2014, pp. 3014-3018.

Sudeshna Saikia et al., "Synthesis and application of sulfur nanoparticles", Chapter 14, Environmental Technologies to Treat Sulphur Pollution: Principles and Engineering, Jan. 1, 2020, pp. 445-475.

* cited by examiner

[FIG. 1]
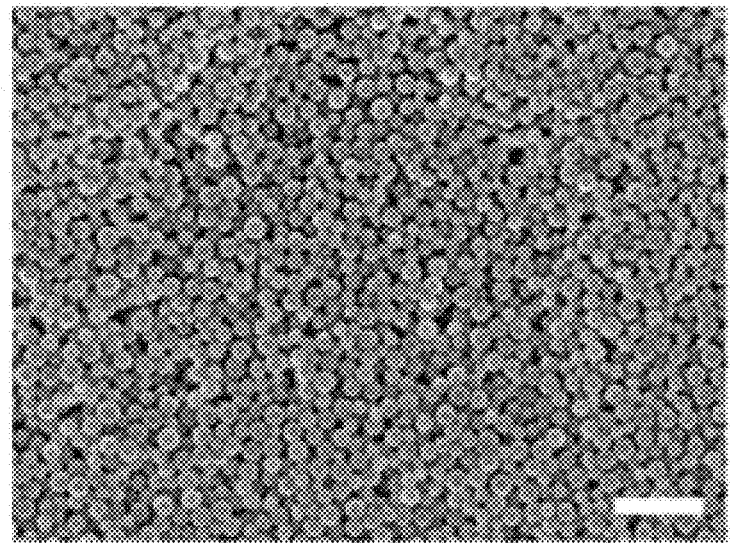
Scale bar = 1 μm
[FIG. 2]
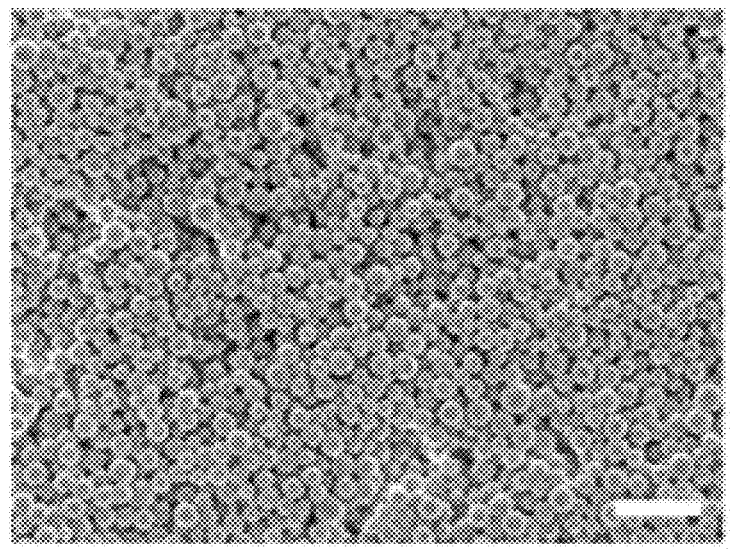
Scale bar = 1 μm

CURABLE COMPOSITION AND OPTICAL MATERIAL

CROSS-REFERENCE TO RELATED APPLICATION(S)

This application is the U.S. national stage of International Application No. PCT/KR2020/014629 filed on Oct. 26, 2020, which claims the benefit of Korean Patent Application No. 10-2019-0137547 filed on Oct. 31, 2019, the disclosures of which are herein incorporated by reference in their entirety.

FIELD OF DISCLOSURE

The present disclosure relates to a curable composition for forming a high refractive index optical material, and an optical material comprising the same.

BACKGROUND

In conventional eyeglass lenses, glass having a high refractive index is used. Although glass may have high refractive index, light transmittance, flatness, strength and scratch prevention effect, it may cause serious damage to the eyeball of a user when broken, and it may cause discomfort when worn for a long time due to its heavy weight from its high density.

To the contrary, plastic lens is lighter than glass lens and thus comfortable to wear, not easily broken, and relatively safer than glass lens even if broken, and capable of implementing various colors. However, it is difficult for plastic lens to realize high refractive index and high Abbes' number compared to glass lens, and thermal deformation may be occurred when the plastic lens is used in devices due to low glass transition temperature.

SUMMARY

The present disclosure provides a curable composition for forming a high refractive index optical material that is lighter than glass or tempered glass used in conventional lenses and the like, that has excellent strength and hardness, that enables implementing various colors, that has low haze value and also enables realization of high refractive index and thus has excellent optical properties, and that has high glass transition temperature and thus is less deformed, and an optical material comprising the curable composition.

According to the present disclosure, there is provided a curable composition for forming a high refractive index optical material, the curable composition comprising: an episulfide compound; sulfur-containing organic particles comprising 60 to 80 wt % of sulfur atoms; and a reducing agent.

According to the present disclosure, there is also provided an optical material comprising: an episulfide compound; sulfur-containing organic particles comprising 60 to 80 wt % of sulfur atoms; and a reducing agent.

Hereinafter, a curable composition and an optical material comprising the same according to specific embodiments of the present disclosure will be described in detail.

The terms used herein are only to describe exemplary embodiments, and are not intended to limit the present disclosure. A singular expression includes a plural expression thereof, unless it is expressly stated or obvious from the context that such is not intended.

As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

As used herein, an "episulfide" means a compound comprising one or more episulfides, wherein the episulfide means a compound in which the oxygen (O) atom of epoxide is substituted with a sulfur (S) atom.

As used herein, "sulfur-containing organic particles" mean organic particles which consist of carbon atoms, hydrogen atoms, oxygen atoms, and the like, and essentially comprises sulfur atoms.

As used herein, 'curing' means both thermal curing and photocuring, and a 'curable composition' means a thermally curable and/or photocurable composition.

As used herein, a high refractive index means a refractive index of about 1.600 or more at a wavelength region of 350 to 800 nm or at a wavelength of 532 nm.

According to one embodiment of the present disclosure, there is provided a curable composition for forming high refractive index optical material, the curable composition comprising: an episulfide compound; sulfur-containing organic particles comprising 60 to 80 wt % of sulfur atoms; and a reducing agent.

The inventors discovered that a composition comprising an episulfide compound; sulfur-containing organic particles comprising 60 to 80 wt % of sulfur atoms; and a reducing agent, and an optical material comprising the same are lighter than glass or tempered glass used in conventional lenses and the like, that the composition and the optical material have excellent physical properties such as strength, hardness, and the like that the composition and the optical material have excellent optical properties as they have high transmittance, low haze and low yellow index (Y.I.), that the composition and the optical material as they have high glass transition temperature and thus have less thermal deformation, and that they can therefore provide an optical material which can replace conventionally used glass or plastic material, and thereby completed the present disclosure.

Thus, the curable composition and the optical material comprising the same can replace conventional glass or optical glass, and can be usefully applied as a display substrate, a display protection film, a touch panel, a lens of wearable devices, and the like.

The episulfide compound included in the curable composition may be represented by the following Chemical Formula 2:

[Chemical Formula 2]

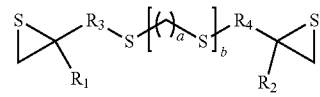

in Chemical Formula 2,
$R_1$ and $R_2$ are each independently hydrogen or C1-10 alkyl,
$R_3$ and $R_4$ are each independently a single bond or C1-10 alkylene,
a is an integer of 0 to 4, and
b is an integer of 0 to 6.

The episulfide compound, due to the above described specific chemical structure, may comprise high content of sulfur (S) atoms having large atomic refraction in the molecule, and may increase the refractive index of the cured product due to such high sulfur atom content.

Moreover, the episulfide compound may be cured by ring opening polymerization, and alkylene sulfide groups formed by the ring opening polymerization of episulfide groups may further increase the refractive index of the cured product.

Meanwhile, in Chemical Formula 2, $R_1$ and $R_2$ may be independently hydrogen or a methyl group, but are not limited thereto.

Moreover, $R_3$ and $R_4$ may be independently a single bond, methylene, ethylene, propylene, isopropylene, butylene, or isobutylene, but are not limited thereto.

Furthermore, a and b may be independently 0 or 1.

In Chemical Formula 2, a refers to the carbon number of an alkylene group included in a thioether repeat unit. If a is too large, it may cause a problem that heat resistance of the cured product is deteriorated because the length of a carbon chain in the molecule may increase, and the glass transition temperature of the cured product may be lowered, and it may also cause a problem that refractive index of the cured product is lowered because a relative sulfur content may decrease.

In Chemical Formula 2, b refers to the repeat number of a thioether repeat unit in which an alkylene group is linked by sulfur (S) atom. If b is too large, it may cause a problem that heat resistance of the cured product is deteriorated because the length of a carbon chain in the molecule may increase and the glass transition temperature of the cured product may be lowered.

The compound represented by Chemical Formula 2 may be used alone, or in combination of two or more kinds.

The episulfide compound may comprise, for example, at least one selected from the group consisting of bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane, and 1,4-bis(β-epithiopropylthio)butane, but is not limited thereto.

The episulfide compound may be included in the content of 50 to 99 wt %, 60 to 95 wt %, or 70 to 90 wt %, based on 100 wt % of the total curable composition. If the content of the episulfide compound is too large, yellowness of optical material such as a plastic substrate, and the like, manufactured after curing, may increase, and if it is too small, haze of optical material manufactured after curing may increase, and thus, transparency may decrease.

The curable composition may comprise sulfur-containing organic particles comprising 60 to 80 wt % of sulfur atoms. The sulfur-containing organic particles comprising 60 to 80 wt % of sulfur atoms may be used as a curing agent for curing the curable composition comprising an episulfide compound, and specifically, the reducing agent included in the curable composition may reduce the surface of each sulfur-containing organic particle to form 2 or more thiol groups, and such two or more thiol groups may react with the episulfide compound to newly form disulfide bonds, enabling the formation of a cured product.

Since the curable composition comprises the sulfur-containing organic particles comprising 60 to 80 wt % of sulfur atoms, the cured product of the curable composition, namely optical material, may have excellent optical properties such as transmittance, haze and yellow index, the glass transition temperature may be increased to 80° C. or more, and it may exhibit a high refractive index of 1.710 or more.

The sulfur-containing organic particles comprising 60 to 80 wt % of sulfur atoms may comprise repeat units represented by the following Chemical Formula 1:

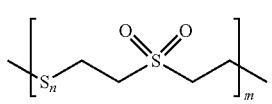

[Chemical Formula 1]

in Chemical Formula 1,
n is an integer of 1 to 10, and
m is an integer of 1 to 1000.

The sulfur-containing organic particles may comprise 1 to 1000, 2 to 800, or 10 to 500 repeat units of Chemical Formula 1.

Moreover, in one or more of the repeat units included in the sulfur-containing organic particles, n may be 2, and it may correspond to a disulfide bond when n is 2. Furthermore, n may be 3 to 9, 4 to 8, or 5 to 7.

The sulfur-containing organic particles may comprise sulfur atoms in the amount of 60 to 80 wt %, 65 to 77 wt %, or 67 to 74 wt %. If the content of the sulfur atoms included in the sulfur-containing organic particles is too small, transmittance may be lowered but without refractive index increasing effect. If the content of the sulfur atoms is too large, refractive index increasing effect may be obtained, but yellow index may be increased.

The sulfur-containing organic particles comprising 60 to 80 wt % of sulfur atoms may have particle diameters of 20 to 300 nm, 30 to 250 nm, or 50 to 200 nm. If the particle diameter of the sulfur-containing organic particles is too small, the organic particle may not maintain the shape of the particle during a reduction reaction by a reducing agent, and if the particle diameter is too large, the transmittance of a high refractive index plastic substrate may be lowered, and the haze may be increased.

The sulfur-containing organic particles comprising 60 to 80 wt % of sulfur atoms may be prepared by the following method. Specifically, sodium sulfide nonahydrate ($Na_2S \cdot 9H_2O$) may be reacted with sulfur ($S_8$) to prepare polysulfide ($Na_2S_a$, a is an integer of 1 to 10), and the polysulfide may be mixed with divinyl sulfone, a surfactant and a steric stabilizer to prepare the sulfur-containing organic particles.

Meanwhile, the content of the sulfur-containing organic particles comprising 60 to 80 wt % of sulfur atoms may be 0.1 to 30 wt %, 0.5 to 25 wt %, or 1 to 20 wt %, based on 100 wt % of the total curable composition. If the content of the sulfur-containing organic particles is too large, the haze of optical material formed after curing may increase, and the yellow index may also increase, and if the content of the sulfur-containing organic particles is too small, the refractive index of optical material formed after curing may be lowered.

And, the weight ratio of the episulfide compound to the sulfur-containing organic particles comprising 60 to 80 wt % of sulfur atoms may be 1:0.01 to 0.5, 1:0.02 to 0.3, or 1:0.03 to 0.2. If the weight ratio of the episulfide compound to the sulfur-containing organic particles is less than 1:0.01, the yellow index of optical material such as a plastic substrate, formed after curing, may increase, and if it is greater than 1:0.5, the refractive index of optical material formed after curing may be lowered.

The curable composition may comprise a reducing agent. The reducing agent may reduce the surface of each sulfur-containing organic particle comprising 60 to 80 wt % of sulfur atoms to form 2 or more thiol groups. Thus, it can not only increase a reaction rate of the episulfide compound and the sulfur-containing organic particles, but also prevent production of unreacted compounds, thereby lowering haze and yellow index of the cured product to improve optical properties and increase glass transition temperature, while maintaining high refractive index and excellent mechanical properties.

The reducing agent may comprise, for example, at least one selected from the group consisting of triphenylphosphine ($PPh_3$), tris(2-carboxylethyl)phosphine (TCEP), 1,4-dimercaptobutane-2,3-diol (DTT), tris(3-hydroxypropyl) phosphine (THPP), beta-mercaptoethanol (BME) and dithiobutylamine (DTBA).

The content of the reducing agent may be 0.1 to 15 wt %, 1 to 14 wt %, or 2 to 13 wt %, based on 100 wt % of the total curable composition. If the content of the reducing agent is too large, glass transition temperature (Tg) of the optical material formed after curing may be lowered, and if it is too small, haze of the optical material may increase.

Moreover, in the curable composition, the weight ratio of the reducing agent to the sulfur-containing organic particles may be 1:0.01 to 20, 1:0.1 to 15, or 1:0.15 to 10. If the weight ratio of the reducing agent to the sulfur-containing organic particles is less than 1:0.01, glass transition temperature (Tg) of the optical material formed after curing may be lowered, and if it is greater than 1:20, haze of the optical material may increase.

The curable composition according to one embodiment may further comprise a catalyst. The catalyst is not specifically limited as long as it performs a function for accelerating the curing reaction of a curable composition, but for example, imidazole derivatives such as imidazole, 2-methylimidazole, 2-ethylimidazole, 2-ethyl-4-methylimidazole, 2-phenylimidazole, 4-phenylimidazole, 1-cyanoethyl-2-phenylimidazole, 1-(2-cyanoethyl)-2-ethyl-4-methylimidazole, and the like; amine compounds such as dicyandiamide, benzyldimethylamine, 4-(dimethylamino)-N,N-dimethyl benzylamine, 4-methoxy-N,N-dimethyl benzylamie, 4-methyl-N,N-dimethyl benzylamine, N,N-cicyclohexylmethylamine, and the like; hydrazine compounds such as adipic acid dihydrazide, sebacic acid dihydrazide, and the like; phosphorus compounds such as triphenylphosphine, and the like, may be mentioned. And, as commercially available catalysts, for example, 2MZ-A, 2MZ-OK, 2PHZ, 2P4BHZ, 2P4MHZ (product names of imidazole-based compounds) manufactured by Shikoku Kasei Kogyo Co., Ltd., U-CAT3503N, UCAT3502T (product names of block isocyanate of dimethylamine) manufactured by San-Apro Ltd., DBU, DBN, U-CATSA102, U-CAT5002 (bicyclic amidine compounds and salts thereof), and the like, may be mentioned.

The content of the catalyst may be 0.001 to 10 wt %, 0.01 to 5 wt %, or 0.1 to 1 wt %, based on 100 wt % of the total curable composition. If the content of the catalyst is too large, curing speed may increase and thus storage stability of the composition may be deteriorated, and if it is too small, curing speed may decrease and thus a thermal curing process may be prolonged.

Besides, the curable composition may further comprise other additives used to provide specific functions to display substrates in the technical field to which the present disclosure pertains, such as UV absorber, bluing agent, pigment, and the like.

According to another embodiment of the present disclosure, there is provided an optical material comprising: an episulfide compound; sulfur-containing organic particles comprising 60 to 80 wt % of sulfur atoms; and a reducing agent.

For the episulfide compound, the sulfur-containing organic particles comprising 60 to 80 wt % of sulfur atoms, the reducing agent, additives, and the like included in the optical material, the above description regarding the curable composition is applied.

Such optical material may be prepared by curing the above described curable composition. Specifically, the above described curable composition or a homogeneous composition comprising the curable composition and various additives is prepared, and the composition may be injected into forms combining a mold made of glass, metal or polymer resin, and the like, and a resinous gasket, and heated and cured. Wherein, in order to facilitate taking out of the resin finally prepared after molding, the mold may be previously treated with a release agent, or a release agent may be further added to the above described composition before use.

The curing temperature may vary according to the kind and content of compounds used, and the like, but it may be generally progressed at about 50 to about 120° C., or about 60 to about 100° C., and the curing time may be about 0.1 to about 72 hours, or about 0.5 to about 24 hours.

The curing reaction may be progressed by combining a process of maintaining a predetermined polymerization temperature as described above for a certain time, a temperature increasing process, and a temperature decreasing process, and the like, and after the reaction is finished, post-treatment may be conducted at about 50 to about 150° C., or about 80 to about 120° C. for about 10 minutes to about 3 hours, so as to prevent deformation.

The optical material released after polymerization may be equipped with various functionalities, through the subsequent processes of dyeing, coating, and the like.

The optical material according to another embodiment may have a refractive index of 1.710 or more, 1.715 to 1.800, or 1.720 to 1.800.

And, the optical material may have very high transmittance of 80% or more, 80 to 99%, or 85 to 99%, specifically measured according to JIS K 7361, when the thickness is 1 mm.

And, the optical material may have very low haze value of 1.2% or less, 0.01 to 1.0%, or 0.01 to 0.7%, specifically measured according to JIS K 7136, when the thickness if 1 mm.

And, the optical material may have glass transition temperature of 80° C. or more, 83 to 99° C., or 85 to 99° C.

The optical material according to another embodiment may be included in a wearable device, and specifically, it may be used for lens of wearable devices, instead of glass or tempered glass.

Namely, the optical material has a high refractive index equivalent to glass, is lighter than glass or tempered glass, has excellent optical properties as well as mechanical properties such as hardness and strength, and the like, and has high glass transition temperature, and thus, it may be used as lenses of wearable devices, such as augmented reality devices or virtual reality devices that may be heated.

Advantageous Effects

According to the present disclosure, there are provided a curable composition for forming high refractive index optical material that is lighter than glass or tempered glass used in the existing lenses, and the like, has excellent strength and hardness, enables realization of various colors, enables realization of high refractive index, has low haze value and thus has excellent optical properties, and has high glass transition temperature and thus is less deformed, and optical material comprising the same.

BRIEF DESCRIPTION OF THE DRAWINGS

FIG. 1 is a photograph of the polysulfide aqueous solution prepared in Preparation Example, taken by scanning electron microscope.

FIG. 2 is a photograph of the sulfur-containing organic particles prepared in Preparation Example, taken by scanning electron microscope.

DETAILED DESCRIPTION

Hereinafter, of the present disclosure will be described in more detail through specific examples. However, these examples are presented only as the illustrations of the present disclosure, and the scope of the right of the invention is not determined thereby.

Preparation Example: Preparation of Sulfur-Containing Organic Particles A

Into a 250 mL round-bottom flask, 100 ml of triple distilled water was put, and degassed with argon (Ar) gas for 2 hours. And then, a 20 ml vial was closed with a septum and replaced with argon (Ar) gas, and oxygen ($O_2$) gas included was removed by vacuum, which process was repeated three times. 2.401 g of sodium sulfide nonahydrate ($Na_2S \cdot 9H_2O$) and 961.98 mg of sulfur ($S_8$) were introduced and 8 mL of degassed distilled water was added, and the reaction solution was heated to 30° C. and stirred for 12 hours. After the reaction was finished, 2 mL of degassed distilled water was added to prepare a polysulfide ($Na_2S_4$) aqueous solution. Wherein, the reaction formula of preparing the polysulfide ($Na_2S_4$) aqueous solution is as follows, and FIG. 1 is a photograph of the prepared polysulfide aqueous solution, taken by scanning electron microscope.

[Reaction Formula 1]

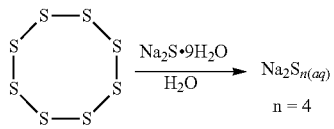

And then, into a 20 mL vial, 85 mg of polyvinylpyrrolidone and 288 mg of sodium dodecyl sulfate (SDS) were introduced, and a process of replacing with argon gas and removing oxygen gas in the vial by vacuum was repeated three times. And then, 10 mL of degassed triple distilled water was added, and the reaction solution was heated to 30° C. and stirred for 12 hours. And, 0.05 mL of divinyl sulfone (DVS) from which an inhibitor had been removed was introduced into the vial, and the reaction solution was stirred for 10 minutes. And then, 0.45 mL of the polysulfide ($Na_2S_4$) aqueous solution was slowly added for 40 seconds using a liquid injector, and then, reacted for 30 minutes. After confirming that a turbid yellow solution turned into turbid white, hydrochloric acid was added to adjust the pH of the solution to 7. And then, a process of precipitating the product on triple distilled water using a centrifuge, and removing polyvinylpyrrolidone and sodium dodecyl sulfate was repeated 10 times, and by drying in a vacuum oven, sulfur-containing organic particles A were prepared.

Wherein, the reaction formula of preparing sulfur-containing organic particles is as shown in the following Reaction Formula 2, wherein n denotes the number of sulfur atoms included in the aqueous solution of a polysulfide compound, and the polysulfide compound comprises 4 sulfur atoms. Meanwhile, m denotes the number of repeat units included in the prepared sulfur-containing organic particles. And, it was confirmed through element analysis of the prepared sulfur-containing organic particles, that the content of sulfur atoms is 80 wt %. And, FIG. 2 is a photograph of the prepared sulfur-containing organic particles, taken by scanning electron microscope, confirming that the particle diameter of each prepared sulfur-containing organic particles is 200 nm.

[Reaction Formula 2]

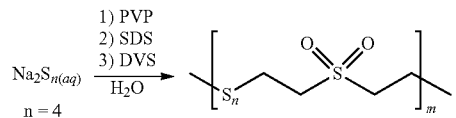

Example 1

1 g of the following episulfide compound 70A, 0.024 g of the sulfur-containing organic particles A prepared in the Preparation Example, 0.123 g of a reducing agent triphenylphosphine ($PPh_3$), and 0.05 g of a dispersant cetyl trimethylammonium bromide (CTAB) were mixed, and then, the mixed solution was filtered using a glass filter having a pore size of 1 μm. And then, on each side of LCD Glass having a width of 10 cm and a height of 10 cm, slide glass having a thickness of 1 mm was placed, and about 5 g of the above mixed solution was applied on the center of the LCD Glass, and then, covered with another LCD Glass, thus preparing a mold. It was put in an oven, and a curing reaction was progressed at about 60° C. for about 10 hours, and at about 90° C. for about 4 hours. After taking out from the oven, the LCD glasses were removed to obtain a plastic specimen, which is a flat optical member. The thickness of the plastic specimen was about 1 mm, when measured using a thickness gauge (Model: ID-C112XBS) manufactured by Mitutoyo corporation.

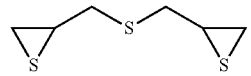

70A

Examples 2 to 5 and Comparative Example 1

Curable compositions and the cured products thereof, plastic specimens, were prepared by the same method as Example 1, except that the episulfide compounds, sulfur-containing organic particles A, reducing agents, dispersants and catalysts were used in the contents described in the following Table 1. Meanwhile, 70B used in Comparative Example 1 is as follows.

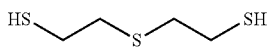

TABLE 1

| (unit: g) | 70A | 70B | Sulfur-containing organic particles A | PPh₃ | TCEP | CTAB | SDS | DCA |
|---|---|---|---|---|---|---|---|---|
| Example 1 | 1.000 | — | 0.024 | 0.123 | — | 0.050 | — | — |
| Example 2 | 1.000 | — | 0.024 | 0.123 | 0.050 | — | 0.050 | — |
| Example 3 | 1.000 | — | 0.050 | — | 0.050 | 0.020 | — | 0.011 |
| Example 4 | 1.000 | — | 0.100 | — | 0.050 | 0.020 | — | 0.021 |
| Example 5 | 1.000 | — | 0.200 | — | 0.050 | 0.020 | — | 0.031 |
| Comparative Example 1 | 0.900 | 0.100 | — | — | — | — | — | — |

TCEP: reducing agent, tris(2-carboxyethyl)phosphine
SDS: dispersant, Sodium Dodecyl Sulfate
DCA: catalyst, Dicyclohexylamine Property Evaluation 1. Evaluation of Transmittance, Haze and Yellow Index For each of the above specimens, based on 1 mm standard thickness, in the thickness direction of the cured product, using NDH-5000 manufactured by Nippon Denshoku Industries Co. LTD, transmittance (JIS K 7361) and haze (JIS K 7136) were measured, and the results were shown in the following Table 2.

And, for each specimen, using a colorimeter, yellow index was measured, and the results were shown in the following Table 2.

2. Measurement of Glass Transition Temperature (Tg)

For each specimens, using differential scanning calorimeter (DSC) manufactured by TA Instrument Inc., glass transition temperature was measured, and the results were shown in the following Table 2.

3. Measurement of Refractive Index

For each specimen, using spectroscopic ellipsometry manufactured by Ellipso Technology Co. Ltd., a refractive index value was measured at the wavelength of 532 nm, and the results were shown in the following Table 2.

TABLE 2

| | Transmittance (%) | haze | Yellow index (Y.I.) | Glass transition temperature (° C.) | Refractive index |
|---|---|---|---|---|---|
| Example 1 | 87.8 | 0.3 | 3.4 | 84 | 1.715 |
| Example 2 | 87.5 | 0.7 | 3.7 | 80 | 1.710 |
| Example 3 | 87.5 | 0.6 | 3.5 | 85 | 1.725 |
| Example 4 | 87.5 | 0.6 | 3.6 | 85 | 1.750 |
| Example 5 | 86.4 | 1.0 | 4.7 | 80 | 1.745 |
| Comparative Example 1 | 88.0 | 0.3 | 3.4 | 74 | 1.705 |

Referring to Table 2, it was confirmed that the specimens comprising the composition according to Examples of the present disclosure not only exhibit excellent optical properties, including high transmittance, and low haze and yellow index, but also exhibit very high glass transition temperature (Tg) of 85° C. or less, and high refractive indexes of 1.710 or more. Meanwhile, it was confirmed that in the case of Comparative Example 1, both glass transition temperature and refractive index are low.

What is claimed is:

1. A curable composition for forming a high refractive index optical material, the curable composition comprising an episulfide compound;

sulfur-containing organic particles comprising 60 to 80 wt % of sulfur atoms; and a reducing agent, wherein the sulfur-containing organic particles comprising 60 to 80 wt % of sulfur atoms comprise repeat units represented by the following Chemical Formula 1:

[Chemical Formula 1]

$$\left[ S_n \diagdown \diagup \diagdown \underset{\underset{O}{\overset{O}{\parallel}}}{S} \diagup \diagdown \diagup \right]_m$$

in Chemical Formula 1,
n is an integer of 1 to 10, and
m is an integer of 1 to 1000.

2. The curable composition according to claim 1, wherein the weight ratio of the episulfide compound to the sulfur-containing organic particles comprising 60 to 80 wt % of sulfur atoms is 1:0.01 to 0.5.

3. The curable composition according to claim 1, wherein the sulfur-containing organic particles comprising 60 to 80 wt % of sulfur atoms have particle diameters of 20 to 300 nm.

4. The curable composition according to claim 1, wherein the episulfide compound is represented by the following Chemical Formula 2:

[Chemical Formula 2]

in Chemical Formula 2,
R₁ and R₂ are each independently hydrogen or C1-C10 alkyl,
R₃ and R₄ are each independently a single bond or C1-C10 alkylene,
a is an integer of 0 to 4, and
b is an integer of 0 to 6.

5. The curable composition according to claim 1, wherein the episulfide compound comprises at least one selected from the group consisting of bis(β-epithiopropyl) sulfide, bis(β-epithiopropyl) disulfide, bis(β-epithiopropylthio) methane, 1,2-bis(β-epithiopropylthio)

ethane, 1,3-bis(β-epithiopropylthio) propane, and 1,4-bis(β-epithiopropylthio) butane.

6. The curable composition according to claim 1, wherein the reducing agent is included in the amount of 0.1 to 15 wt %, based on 100 wt % of the total curable composition.

7. The curable composition according to claim 1, wherein the reducing agent comprises at least one selected from the group consisting of triphenylphosphine ($PPh_3$), tris(2-carboxylethyl) phosphine (TCEP), 1,4-dimercaptobutane-2,3-diol (DTT), tris(3-hydroxypropyl)phosphine (THPP), beta-mercaptoethanol (BME) and dithiobutylamine (DTBA).

\* \* \* \* \*